United States Patent
Tanimoto

(10) Patent No.: US 7,558,983 B2
(45) Date of Patent: Jul. 7, 2009

(54) ELECTRONIC MAIL SERVER WITH FACSIMILE TRANSMISSION ON ELECTRONIC MAIL TRANSMISSION FAILURE

(75) Inventor: Yoshifumi Tanimoto, Hirakata (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 469 days.

(21) Appl. No.: 10/464,729

(22) Filed: Jun. 19, 2003

(65) Prior Publication Data
US 2004/0024829 A1 Feb. 5, 2004

(30) Foreign Application Priority Data
Jun. 21, 2002 (JP) ............................. 2002-182056

(51) Int. Cl.
*G06F 11/00* (2006.01)
*H04L 12/66* (2006.01)
(52) U.S. Cl. .................. 714/18; 455/414.4; 709/206; 709/207; 379/100.13; 379/100.15; 358/407
(58) Field of Classification Search ............ 455/414.4; 709/206, 207; 714/18; 379/100.13, 100.15; 358/407
See application file for complete search history.

(56) References Cited

U.S. PATENT DOCUMENTS

| | | | | |
|---|---|---|---|---|
| 4,642,697 | A | * | 2/1987 | Wada ........................ 358/439 |
| 5,555,100 | A | * | 9/1996 | Bloomfield et al. ......... 358/402 |
| 6,020,980 | A | * | 2/2000 | Freeman .................... 358/402 |
| 6,104,500 | A | * | 8/2000 | Alam et al. ................. 358/1.15 |
| 6,266,160 | B1 | * | 7/2001 | Saito et al. ................. 358/407 |

(Continued)

FOREIGN PATENT DOCUMENTS

JP 11-205574 7/1999

OTHER PUBLICATIONS

DOTS for Email Validation http://www.serviceobjects.com/products/dots_email.asp Mar. 26, 2002 version found via the Way Back Machine.*

(Continued)

*Primary Examiner*—Scott T Baderman
*Assistant Examiner*—Joseph Schell
(74) *Attorney, Agent, or Firm*—Westerman, Hattori, Daniels & Adrian, LLP.

(57) ABSTRACT

To reduce workload on an Internet facsimile machine on the transmission side, and to execute a retransmission processing promptly and reliably, an electronic mail server device includes a function for receiving an electronic mail, a function for transmitting the received electronic mail to the Internet facsimile machine of a destination via the Internet, and a function for carrying out a facsimile transmission of the image data via a public telephone network. The electronic mail server device also includes a RAM which stores an address/number corresponding table which corresponds the electronic mail address and the facsimile number of the Internet facsimile machine of the destination. When receiving the electronic mail including the image data, and failing to transmit the electronic mail including the image data to the Internet facsimile machine of the destination, a main control unit carries out a facsimile transmission of the image data of the electronic mail to the Internet facsimile machine of the destination via the public telephone network in accordance with the facsimile number corresponding to the electronic mail address of the Internet facsimile machine of the destination.

8 Claims, 4 Drawing Sheets

U.S. PATENT DOCUMENTS

| | | | | |
|---|---|---|---|---|
| 6,417,930 | B2 * | 7/2002 | Mori | 358/1.15 |
| 6,466,330 | B1 * | 10/2002 | Mori | 358/1.15 |
| 6,512,593 | B1 * | 1/2003 | Yashiki | 358/1.15 |
| 6,636,587 | B1 * | 10/2003 | Nagai et al. | 379/88.14 |
| 6,700,674 | B1 * | 3/2004 | Otsuka et al. | 358/1.15 |
| 6,823,367 | B1 * | 11/2004 | Wakasugi et al. | 709/206 |
| 6,825,955 | B1 * | 11/2004 | Shibata | 358/402 |
| 6,856,432 | B2 * | 2/2005 | Bobrow et al. | 358/402 |
| 6,897,985 | B1 * | 5/2005 | Toyoda | 358/402 |
| 6,912,062 | B2 * | 6/2005 | Kihara | 358/1.15 |
| 6,965,446 | B2 * | 11/2005 | Wakabayashi | 358/1.15 |
| 6,985,494 | B2 * | 1/2006 | Thompson | 370/466 |
| 7,177,909 | B2 * | 2/2007 | Stark et al. | 709/206 |
| 7,280,239 | B2 * | 10/2007 | Sekiguchi | 358/1.15 |
| 2002/0054363 | A1 * | 5/2002 | Eguchi | 358/402 |
| 2003/0016394 | A1 * | 1/2003 | Shinomiya | 358/402 |
| 2003/0200266 | A1 * | 10/2003 | Henry | 709/206 |

OTHER PUBLICATIONS

Postfix by Richard Blum Published by Sams Publishing May 15, 2001 ISBN 0-672-32114-9.*

Linux Network Administrator's Guide, 2$^{nd}$ Edition by Terry Dawson and Olaf Kirch Published by O'Reilly Jun. 2000 ISBN 1-56592-400-2.*

Mail Delivery Agent Wikipedia Article http://en.wikipedia.org/wiki/Mail_Delivery_agent.*

Bootcamp Week 182: Email and PC Security published by telegraph.co.uk, Jul. 5, 2001 http://www.telegraph.co.uk/connected/main.jhtml?xml=/connected/2001/07/05/ecrcomp05.xml.*

* cited by examiner

ADDRESS/NUMBER CORRESPONDING TABLE 107a

| ELECTRONIC MAIL ADDRESS | FACSIMILE NUMBER | RELAY ELECTRONIC MAIL ADDRESS |
|---|---|---|
| ifax2@sample.or.jp | 075-123-4567 | — |
| ifax3@sample.or.jp | 075-234-5678 | ifax5@sample.or.jp |
| ifax4@sample.or.jp | 078-123-1234 | — |

ELECTRONIC MAIL SERVER WITH FACSIMILE TRANSMISSION ON ELECTRONIC MAIL TRANSMISSION FAILURE

FIELD OF THE INVENTION

The present invention is related to an electronic mail server device which forwards an electronic mail including an attached file of image data to a recipient.

DESCRIPTION OF THE RELATED ART

Conventionally, the International Telecommunication Union-Telecommunications (ITU-T) Recommendation T.37 proposes an Internet facsimile communication system using an Internet facsimile machine which transmits and receives image data via the Internet by using an electronic mail. The Internet facsimile machine transmits an electronic mail including image data to an electronic mail server device (gateway device) of a recipient via an electronic mail server device (gateway device) of a transmitter and the Internet under a Simple Mail Transfer Protocol (SMTP) method. The Internet facsimile machine of the recipient can gain access to the recipient's electronic mail server device under a Post Office Protocol (POP) 3 method. Then, the Internet facsimile machine of the recipient can receive the electronic mail including the image data, and can print out the received image data by using an image printing unit.

The conventional Internet facsimile machine includes an Internet facsimile function for transmitting image data via the Internet by using an electronic mail, and a general facsimile function for transmitting the image data via a public telephone line. The function to be used is designated at the time of the transmission of the image data.

In the conventional Internet facsimile machine, when there is a failure to transmit an electronic mail including the image data via the Internet, the image data that should be transmitted is transmitted via the public telephone line by using the general facsimile function, for example, under a G3 facsimile mode. In this case, the Internet facsimile machine is executing the transmission of the image data when there is a failure in the transmission of the image data. Therefore, there would be a problem in that the amount of workload applied to the Internet facsimile machine is increased.

Moreover, there are cases when a notification of the failure in the transmission of the image data is not forwarded by the electronic mail server device. In such cases, a processing of retransmission via the public telephone line cannot be executed. Furthermore, even when the notification of the failure in the transmission of the image data is forwarded by the electronic mail server device, there are cases when the processing of retransmission cannot be promptly carried out due to a delay in the notification. In addition, it was necessary for the Internet facsimile machine to store and hold the image data in preparation to the retransmission, thus become a load for the Internet facsimile machine.

SUMMARY OF THE INVENTION

An advantage of the present invention is to solve the above-mentioned problems. In addition, an advantage of the present invention is to provide an electronic mail server device which can reduce the workload placed on an Internet facsimile machine of a transmitter, and which can execute a processing of retransmission promptly and reliably.

The electronic mail server device of the present invention includes an electronic mail receiving unit which receives an electronic mail, and an electronic mail transmitting unit which transmits the electronic mail received by the electronic mail receiving unit to a destination terminal. In addition, the electronic mail server device includes a facsimile transmitting unit which transmits image data by facsimile, and a storage unit that can store an electronic mail address and a facsimile number of the destination terminal which are corresponding to one another. The electronic mail server device also includes a control unit which controls the facsimile transmitting unit to carry out a facsimile transmission of the image data included in the received electronic mail to the destination terminal in accordance with the facsimile number corresponding to the electronic mail address of the destination terminal, when the electronic mail transmitting unit fails to transmit the electronic mail including the image data to the destination terminal.

Therefore, since the electronic mail server device can execute the retransmission process, workload on the communication terminal device of a transmitter can be reduced, and the retransmission process can be executed promptly and reliably. In addition, since the electronic mail server device executes the retransmission process, the retransmission from a plurality of terminal devices can be managed in a unified way. Furthermore, since the retransmission is managed in a unified way, even when it becomes necessary to carry out several retransmissions to a same telephone number at the same time, the retransmission can be dealt with by controlling a sequence of order of the transmission. (When retransmission is carried out from several communication devices at the same time, the line becomes busy.) Moreover, since the electronic mail server device can manage the electronic mail address and the telephone number in a unified way, it becomes unnecessary to separately manage each of the terminal devices, and the management of the terminal devices is simplified.

Moreover, the electronic mail server device of the present invention includes an electronic mail receiving unit which receives an electronic mail, and an electronic mail transmitting unit which transmits to a destination terminal an electronic mail received by the electronic mail receiving unit. The electronic mail server device also includes a storage unit that can store an electronic mail address and a facsimile number of the destination terminal which are corresponding to one another. In addition, the electronic mail server device includes a control unit which controls a facsimile machine to carry out a facsimile transmission of the image data included in the received electronic mail to the destination terminal in accordance with the facsimile number corresponding to the electronic mail address of the destination terminal, when the electronic mail transmitting unit fails to transmit the electronic mail including the image data to the destination terminal.

Therefore, since the electronic mail server device executes the retransmission process, workload on the communication terminal device of a transmitter can be reduced, and the retransmission process can be executed promptly and reliably. In addition, since the electronic mail server device executes the retransmission process, the retransmission from a plurality of terminal devices can be managed in a unified way. Furthermore, since the retransmission is managed in a unified way, even when it becomes necessary to carry out several retransmissions to a same telephone number at the same time, the retransmission can be dealt with by controlling a sequence of order of the transmission. (When retransmission is carried out from several communication devices at the same time, the line becomes busy.) Moreover, since the electronic mail server device can manage the electronic mail address and the telephone number in a unified way, it becomes unnecessary to separately manage each of the terminal devices, and the management of the terminal devices is simplified.

Furthermore, the electronic mail server device of the present invention includes an electronic mail receiving unit which receives an electronic mail, and an electronic mail transmitting unit which transmits to a destination terminal an electronic mail received by the electronic mail receiving unit. The electronic mail server device also includes a storage unit which stores an electronic mail address and a facsimile number of the destination terminal by corresponding them to one another. In addition, the electronic mail server device includes a control unit which transmits a relay instruction mail along with the image data and the facsimile number of the destination terminal to a prescribed relay terminal when the electronic mail transmitting unit fails to transmit the electronic mail including the received image data to the destination terminal. Further, the relay instruction mail instructs to forward the image data of the electronic mail to the destination terminal in accordance with the facsimile number corresponding to the electronic mail address of the destination terminal.

Therefore, since the electronic mail server device executes the retransmission process via a prescribed relay terminal, workload on the communication terminal device of a transmitter can be reduced, and the retransmission process can be executed promptly and reliably. In addition, since the electronic mail server device executes the retransmission process, the retransmission from a plurality of terminal devices can be managed in a unified way. Furthermore, since the retransmission is managed in a unified way, even when it becomes necessary to carry out several retransmissions to a same telephone number at the same time, the retransmission can be dealt with by controlling a sequence of order of the transmission. (When retransmission is carried out from several communication devices at the same time, the line becomes busy.) Moreover, since the electronic mail server device can manage the electronic mail address and the telephone number in a unified way, it becomes unnecessary to separately manage each of the terminal devices, and the management of the terminal devices becomes simplified.

DETAILED DESCRIPTION OF THE PREFERRED EMBODIMENTS

Embodiments of the present invention will be described with reference to the accompanying drawings.

Figure 1:
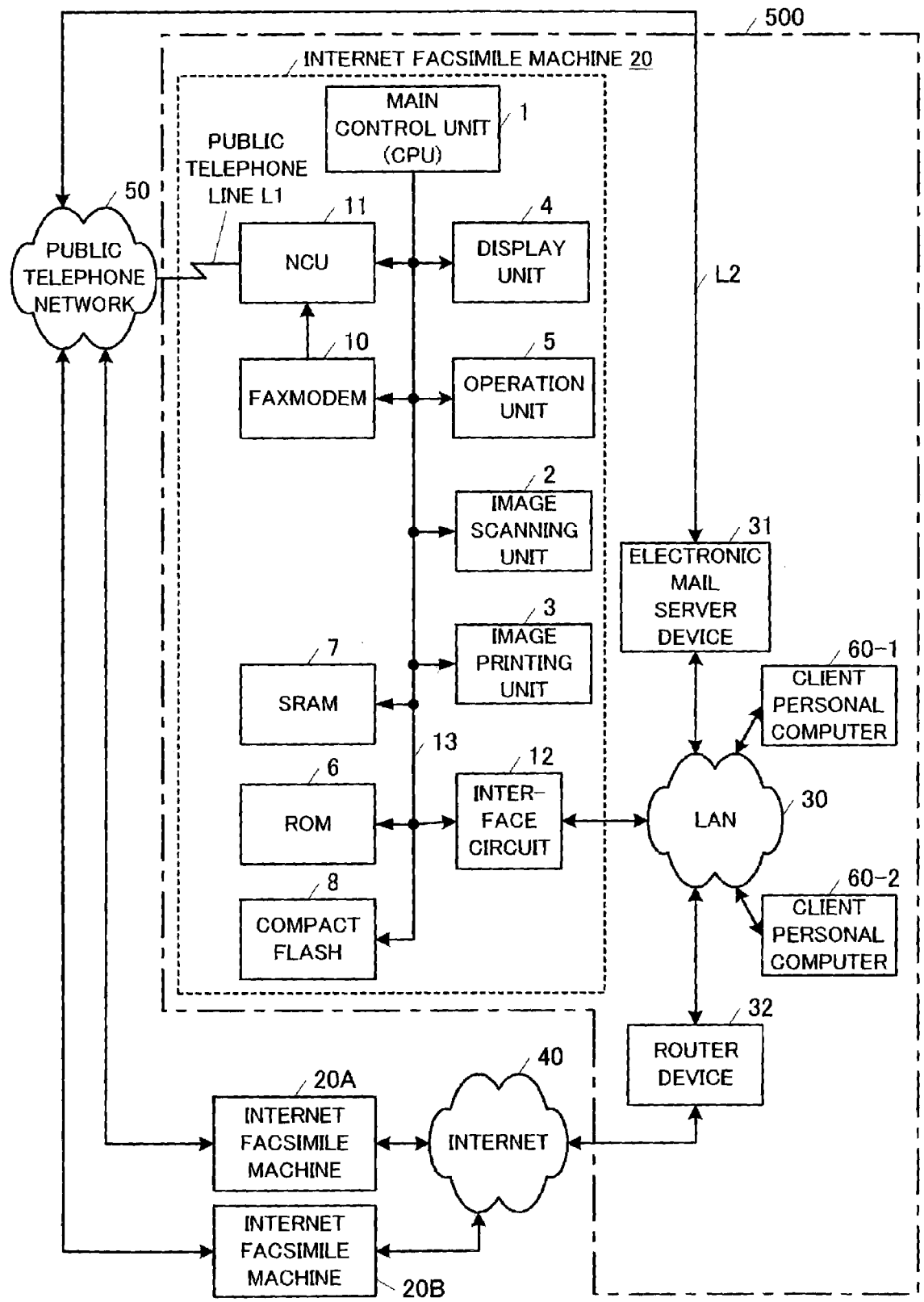
FIG. 1 is a block diagram showing an entire communication system including an office 500 where an Internet facsimile machine 20 and an electronic mail server device 31 are provided, and various devices connected to the Internet facsimile machine 20 and the electronic mail server device 31, according to an embodiment of the present invention.

FIG. 1 is a block diagram showing an entire communication system including an office 500 where an Internet facsimile machine 20 and an electronic mail server device 31 are provided, and various devices connected to the Internet facsimile machine 20 and the electronic mail server device 31, according to an embodiment of the present invention.

Figure 2:
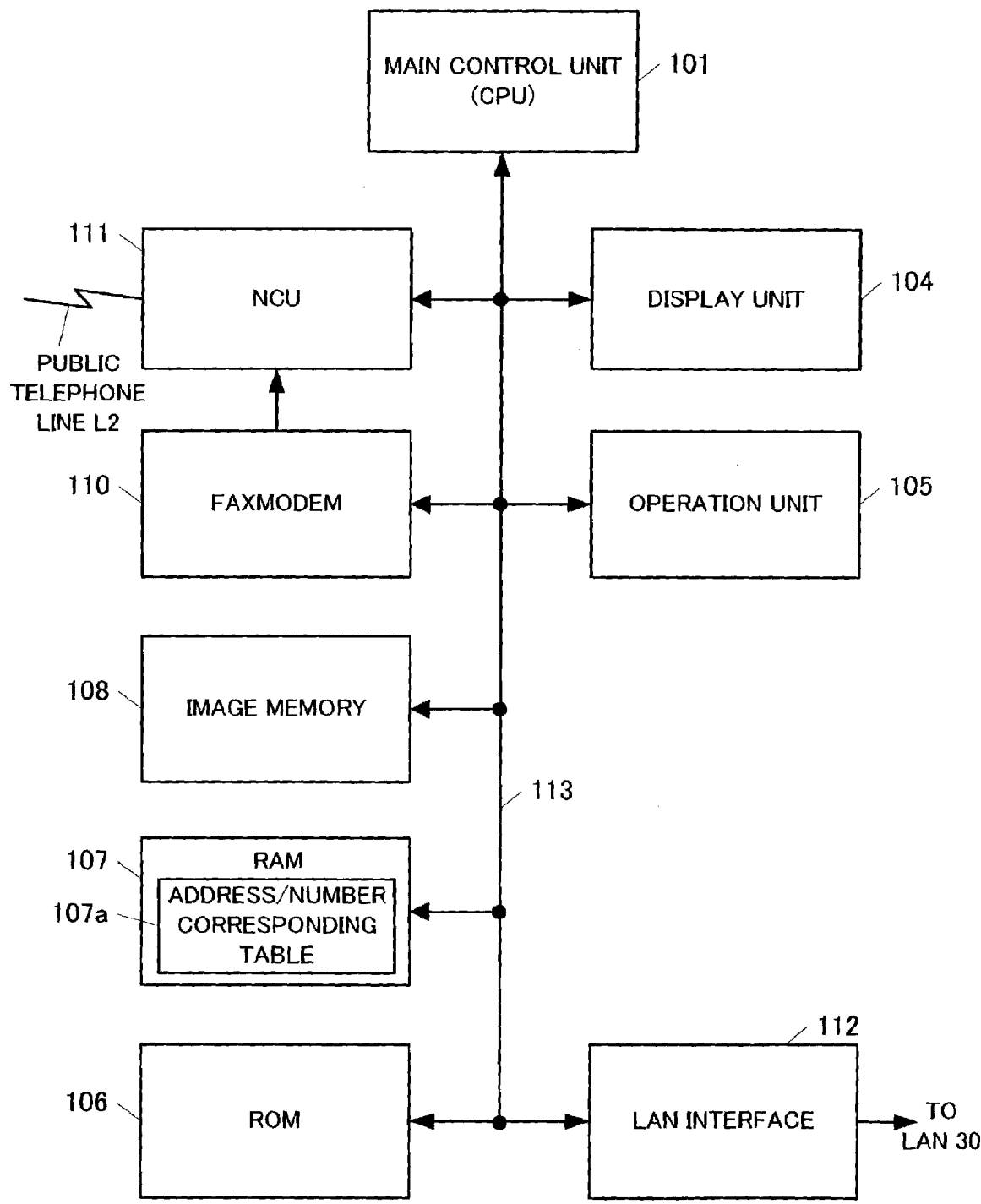
FIG. 2 is a block diagram showing a configuration of the electronic mail server device 31 of FIG. 1.

The electronic mail server device 31 includes an electronic mail transmission function and a facsimile transmission function. The electronic mail transmission function is a function for transmitting to an Internet facsimile machine 20A or an Internet facsimile machine 20B of destinations via the Internet 40 which is a packet exchange network, an electronic mail received from the Internet facsimile machine 20 by a Simple Mail Transfer Protocol (SMTP) or the like. The facsimile transmission function is a function for carrying out a facsimile transmission of image data via a public telephone network 50 which is a circuit switching network. In addition, as shown in FIG. 2, the electronic mail server device 31 includes a Random Access Memory (RAM) 107 which includes an address/number corresponding table 107a for corresponding an electronic mail address with a facsimile number of the Internet facsimile machine 20A or the Internet facsimile machine 20B of the destinations. When the electronic mail transmitting function fails to transmit a received electronic mail including an attached file of image data to the Internet facsimile machine 20A or the Internet facsimile machine 20B of the destination, a main control unit 101 of the electronic mail server device 31 asserts control by using the facsimile transmitting function to carry out a facsimile transmission of the image data of the electronic mail, to the Internet facsimile machine 20A or the Internet facsimile machine 20B of the destinations, via the public telephone network 50 in accordance with the facsimile number corresponding to the electronic mail address of the Internet facsimile machine 20A or the Internet facsimile machine 20B of the destinations.

In FIG. 1, the Internet facsimile machine 20 includes a conventional G3 method of facsimile communication function or the like. In addition, the Internet facsimile machine 20 includes an Internet facsimile function for transmitting and receiving image data by using an electronic mail via the Internet 40. Specifically, the main control unit 1 is formed from a Central Processing Unit (CPU). The main control unit 1 is connected to each of a number of hardware parts to be described below via a bus 13 to control each of the hardware parts. In addition, the main control unit 1 executes various software functions also to be described later on. An image scanning unit 2 scans an original document by a scanner using a Charge-Coupled Device (CCD) or the like, and outputs dotted image data converted into a binary color of black and white. An image printing unit 3 is an electro-photographic typed printing device, and prints out as hardcopy, the image data received by the facsimile communication from other facsimile machines or the like. A display unit 4 is a displaying device such as a Liquid Crystal Display (LCD), a Cathode Ray Tube (CRT) display or the like. The display unit 4 displays an operational state of the Internet facsimile machine 20, or displays image data of an original document that is to be transmitted and received as image data.

An operation unit 5 includes letter keys, a ten-key numeric pad for dialing, speed-dial keys, one-touch dial keys, and various function keys or the like which are necessary for operating the Internet facsimile machine 20. Further, by forming the display unit 4 as a touch panel, a part or all of the various keys of the operation unit 5 can be substituted.

A Read Only Memory (ROM) 6 stores various software programs which are necessary for the operation of the Internet facsimile machine 20, and which are executed by the main control unit 1. These programs can be stored in a recording medium such as a floppy disk, a Magneto-Optic (MO) disk, a Digital Versatile Disk-Random Access Memory (DVD-RAM) or the like. The programs can be loaded to a Static Random Access Memory (SRAM) 7 via a drive device when necessary to be executed. The SRAM 7 is used as a working area of the main control unit 1, which stores temporary data generated when the program is executed. A compact flash (registered trademark) 8 functions as a so-called image memory and a memory as a program recording medium.

A faxmodem 10 is a modem connected to the public telephone network 50 via a public telephone line L1, and includes a function of a faxmodem for general facsimile communication. A Network Control Unit (NCU) 11 is a hardware circuit which carries out opening and closing operations of a direct current loop or the like of the analogue public telephone line L1, and which includes an automatic dial function. The NCU 11 connects the faxmodem 10 to the public telephone line L1 when-deemed necessary. Here, the NCU 11 detects ID receiving terminal starting signal in a caller ID notification service, and a general telephone call indication signal. In addition, the NCU 11 can transmit a first response signal and a second response signal in the caller ID notification service when deemed necessary. Further, the NCU 11 can be connected to a baseband transmission method digital line (for example, Integrated Services Digital Network (ISDN) line) via a prescribed terminal adaptor and a Digital Service Unit (DSU).

An interface circuit 12 is an interface circuit which carries out a signal conversion or a protocol conversion of signal or data to connect the Internet facsimile machine 20 to a Local Area Network (LAN) 30 or the like such as an Ethernet (registered trademark). The electronic mail server device 31, a router device 32, and client personal computers 60-1, 60-2 are connected to the LAN 30.

Furthermore, the router device 32 is connected to an electronic mail server device (not shown in the drawings) of the destination via the Internet 40. When transmitting image data from the Internet facsimile machine 20 as an attached file of an Internet mail, the Internet mail is transmitted to the electronic mail server device 31 via the LAN 30 from the LAN interface 12. Then, the electronic mail server device 31 transmits the Internet mail to the facsimile machine of the destination via the LAN 30, the router device 32, the Internet 40, and the electronic mail server device (not shown in the drawings) of the destination. Meanwhile, when receiving the Internet mail, the Internet mail is received through a channel that is a reverse of the above-described channel. Here, a method for receiving the Internet mail from the electronic mail server device 31 can be a Post Office Protocol (POP) 3 or the SMTP. Further, the connection to the Internet 40 is not limited to a private line, and can be a dial-up connection using the public telephone line L1.

In FIG. 1, two Internet facsimile machines 20A, 20B are shown as an example of the Internet facsimile machine of the destination. However, several other Internet facsimile machines can be provided as the Internet facsimile machine of the destination. Moreover, the Internet facsimile machine 20 is used as a communication terminal device of a transmitter. However, the electronic mail including image data can be transmitted from the client personal computers 60-1, 60-2.

The Internet facsimile machine 20 of the present embodiment includes an Internet facsimile communication function in addition to the general G3 method facsimile communication function. In the facsimile communication function, the dotted image data scanned by the image scanning unit 2 is encoded by a software in accordance with an encoding method such as Modified Huffman (MH), Modified Read (MR), Modified Modified Read (MMR) or the like which are defined as standards of the facsimile communication. Then, the encoded image data is transmitted to the facsimile machine of the destination. Meanwhile, the encoded data received from the facsimile machine of the destination is decoded into image data by the software, and is output from the image printing unit 3 as hardcopy.

FIG. 2 is a block diagram showing a configuration of the electronic mail server device 31 of FIG. 1. In FIG. 2, the electronic mail server device 31 includes a forwarding function for forwarding an electronic mail via the Internet 40, the conventional facsimile communication function which uses the electronic mail, and a conventional G3 method facsimile communication function or the like. Specifically, a main control unit 101 is formed from a Central Processing Unit (CPU). The main control unit 101 is connected to each of a number of hardware parts to be described below via a bus 113 to control each of the hardware parts. In addition, the main control unit 101 executes various software functions. A display unit 104 is a displaying device such as a LCD or a CRT display. The display unit 104 displays an operational state of the electronic mail server device 31, and displays image data of an original document which is to be transmitted, and the display unit 104 also displays received image data. An operation unit 105 includes letter keys, a ten-key numeric pad for dialing, and various function keys or the like which are necessary for operating the electronic mail server device 31. Further, by forming the display unit 104 to be a touch panel, a part or all of the various keys of the operation unit 105 can be substituted.

ROM 106 stores in advance various software programs which are necessary for operating the electronic mail server device 31, and which are to be executed by the main control unit 101. RAM 107 is formed from a SRAM, a Dynamic Random Access Memory (DRAM), and a Synchronous DRAM (SDRAM) or the like. The RAM 107 is used as a working area of the main control unit 101, which stores temporary data that is generated when the program is executed. Here, the RAM 107 stores an address/number corresponding table 107a to be described later on. Further, when a flash memory is used for the RAM 107, contents of the data are not lost even when a power source is shut down due to power failure or a transferring of the device. An image memory 108 is formed from a DRAM or the like. The image memory 108 stores image data required to be transmitted as well as being received.

A faxmodem 110 is a modem which is connected to a public telephone line L2, and which includes a function of a faxmodem for general facsimile communication. NCU 111 is a hardware circuit which carries out opening and closing operations of a direct current loop such as the analogue public telephone line L2, and which includes an automatic dial function. The NCU 111 connects the faxmodem 110 to the public telephone line L2 whenever necessary. Here, the NCU 111 detects ID receiving terminal starting signal in a caller ID notification service, and a general telephone call indication signal. In addition, the NCU 111 can transmit a first response signal and a second response signal in the caller ID notification service when deemed necessary. Further, the NCU 111 can be connected to a baseband transmission method digital line (for example, ISDN line) via a prescribed terminal adaptor and a DSU.

A LAN interface 112 is connected to the LAN 30, and executes interface processing such as signal conversion or protocol conversion by receiving signal or data from the LAN 30, or by transmitting signal or data to the LAN 30.

The electronic mail server device 31 formed as described above includes a forwarding function for forwarding an electronic mail via the Internet 40, and a conventional G3 method facsimile communication function or the like. Further, the image memory 108 stores image data when necessary, and outputs the stored image data when necessary.

Figures 3, 4:
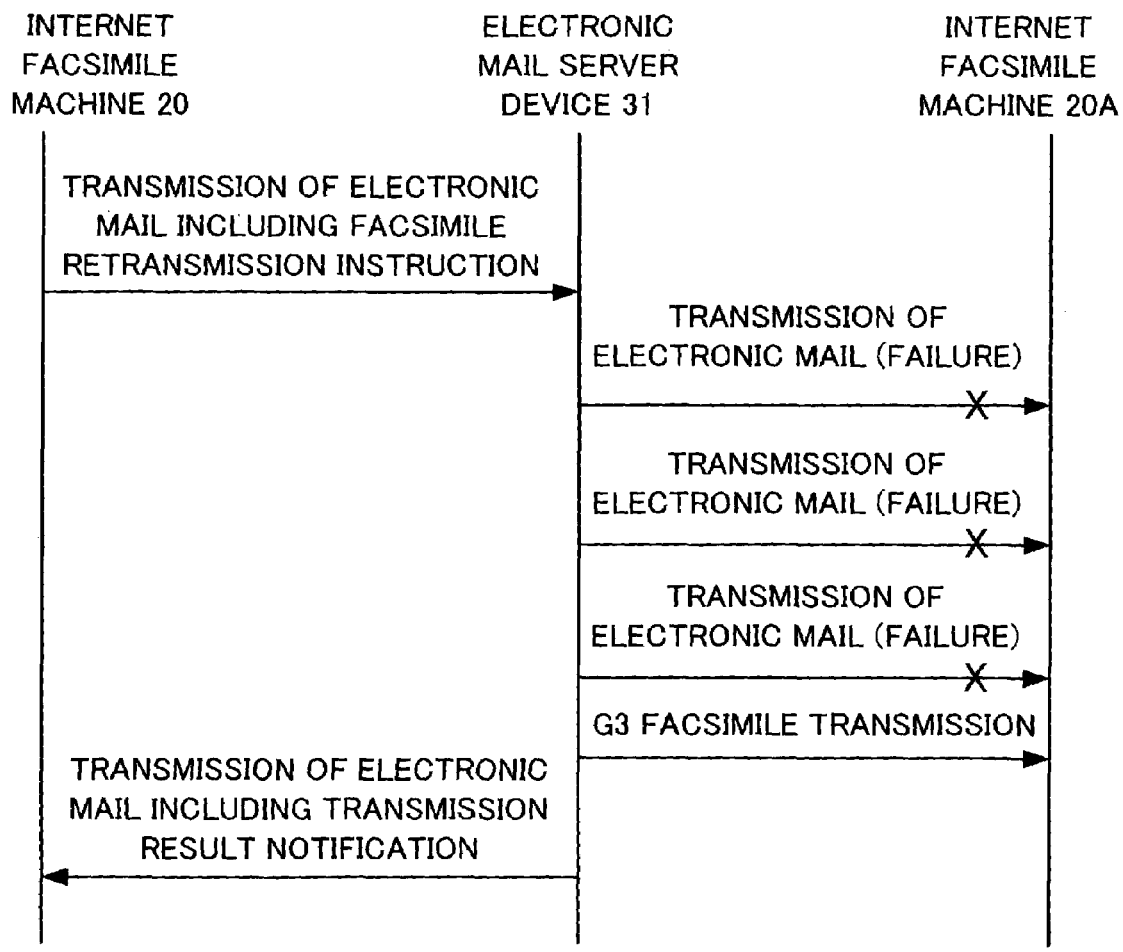
FIG. 3 illustrates an example of an address/number corresponding table 107a of FIG. 2.
FIG. 4 is a sequence diagram showing an operation of each of the devices according to a first embodiment of the present invention.

FIG. 3 illustrates an example of the address/number corresponding table 107a of FIG. 2. As shown in FIG. 3, the address/number corresponding table 107a stores (a) electronic mail address of the Internet facsimile machines 20A, 20B of destination, (b) facsimile number of the Internet facsimile machines 20A, 20b for carrying out a facsimile transmission via the public telephone network 50 in case of a failure to transmit image data by the Internet mail, and (c) relay electronic mail address of the Internet facsimile machine which is a relay communication terminal device for transmitting the image data to the Internet facsimile machine of the destination by relaying and forwarding in case of a failure to transmit the image data by the Internet mail.

FIG. 4 is a sequence diagram showing an operation of each of the devices according to a first embodiment of the present invention. In FIG. 4, first, the Internet facsimile machine 20 transmits an electronic mail to the electronic mail server device 31 via the LAN 30. The electronic mail contains image data as an attached file, and a facsimile retransmission instruction. An example of the electronic mail is shown in the following Chart 1.

(Chart 1) An example of transmitting electronic mail (including the facsimile retransmission instruction)
From: ifax1@sample.co.jp
Date: Wed, Mar 14, 2001 16:04:22 +0900
To: ifax2@sample.co.jp
Subject: SAMPLE MAIL
MIME-Version: 1.0
Content-Type: multipart/mixed; boundary="=_SAMPLE_="--=_SAMPLE_=
Content-Type: text/plain; charset="us-ascii"
Content-Transfer-Encoding: 7 bit
Retry=(MAIL:3)(FAX:15)(3 min)
--=_SAMPLE_=
Content-Type: image/tiff; name="faximage.tif"
Content-Transfer-Encoding: base64
Content-Disposition: attachment; filename="faximage.tif"
SUkqAAgAAAAQAP4ABAABAAAAAgAAAAABBAA
  BAAAAwAYAAAEBBAABA AAAYwQAAAIBAwA-
  BAAAAAQAAAAMBAwABAAAACQAAAAY-
  BAwABAAAA AAAAAAoBAwABAAAAAgAAA-
  BEBBAABAAAA4 AAAABIBAwABAAAAAQAAA
  BUBAwABAAAAAQAAABYBBAABAAAAY-
  wQAABcB
(abbreviated)
BAABAAAA1AEAABoBBQABAAAAzgAAABsBBQA
  BAAAA1gAAACgBAwABAA AAAgAAACk-
  BAwACAAAAAABAAAAAAD-
  MAAAAAQAAAGIAAAABAAAAAA AAAAE-
  AAAAGwAAA//8AAACA
--=_SAMPLE_=--

In the electronic mail shown in the Chart 1, on line 10, it is described as "Rentry=(MAIL:3)(FAX:15)(3 min)". This description communicates an instruction to transmit image data by the facsimile in the case of a failure to transmit the image data by the electronic mail. In addition, it is described that a number of retries for the electronic mail transmission is three times, and a number of retries for the facsimile transmission is 15 times. Furthermore, it is described that an interval between the retries is three minutes. Further, at an end part of the electronic mail, image data having a file name of ""faximage.tif"" is attached.

Next, the electronic mail server device 31 receives the electronic mail, and temporarily stores the data of the electronic mail in the RAM 107. Then, the electronic mail server device 31 attempts to transmit the electronic mail to the Internet facsimile machine 20A of the destination via the Internet 40. In this case, when the transmission fails for three times (when the transmission protocol by the SMTP does not end normally), in accordance with the facsimile retransmission instruction, the image data attached to the electronic mail is encoded into image data for facsimile transmission. Then, the facsimile number corresponding to the electronic mail address of the Internet facsimile machine 20A of the destination is fetched from the address/number corresponding table 107a. A dial and a call is made to the facsimile number via the public telephone network 50, and the encoded image data for the facsimile transmission is transmitted by the facsimile under the G3 facsimile mode. Then, when the facsimile transmission is completed, the electronic mail server device 31 transmits an electronic mail including a transmission result notification, which indicates the completion of the facsimile transmission, to the Internet facsimile machine 20 of the transmitter via the LAN 30.

That is, in the first embodiment, when receiving the electronic mail including the attached file of the image data, and upon failing to transmit the electronic mail to the Internet facsimile machine 20A of the destination by the electronic mail transmission function, the mail control unit 101 of the electronic mail server device 31 asserts control by using the facsimile transmission function so as to transmit the image data of the electronic mail to the Internet facsimile machine 20A of the destination via the public telephone network 50 in accordance with the facsimile number corresponding to the electronic mail address of the Internet facsimile machine 20A of the destination. Therefore, since the retransmission process is executed by the electronic mail server device 31, workload on the Internet facsimile machine of the transmitter can be reduced, and the retransmission process can be executed promptly and reliably.

In the above-described first embodiment, when receiving the electronic mail including the attached file of the image data, and upon failing to transmit the electronic mail by the electronic mail transmission function to the Internet facsimile machine 20A of the destination, the electronic mail server device 31 asserts control by using the facsimile transmission function so as to transmit the image data of the electronic mail to the Internet facsimile machine 20A of the destination via the public telephone network 50 in accordance with the facsimile number corresponding to the electronic mail address of the Internet facsimile machine 20A of the destination. However, the present invention is not limited to this example, and for example, instead of the retransmission by the facsimile transmission function, the retransmission can be carried out by using another Internet facsimile machine connected to the LAN 30.

In the first embodiment, the electronic mail server device 31 includes the address/number corresponding table 107a which is a storage unit that stores an electronic mail address and a telephone number of the communication terminal device which correspond with one another. Upon receiving a transmission mail from a communication terminal device of a transmitter, and upon distributing the transmission mail to the electronic mail address of each of the communication terminal devices of the destination, in case of a failure to distribute the transmission mail, the electronic mail server device 31 refers to the address/number corresponding table 107a, and determines whether a telephone number is registered in association with the electronic mail address of the destination. The electronic mail server device 31 includes a transmission unit which carries out a facsimile transmission of an original document to a communication terminal device of the destination by a facsimile communication function when the telephone number is registered in association with the electronic mail address. Moreover, instead of using the facsimile communication function, the electronic mail server device 31 can control a facsimile terminal device connected to a network, and can carry out a facsimile transmission of the original document to the communication terminal device of the destination from the facsimile terminal device. Here, it can be determined whether to carry out the retransmission by the facsimile communication for each destination terminal, each broadcast address, or according to a device setting, an electronic mail address of the transmitter or the like. Moreover, it can be determined whether to carry out the retransmission by the facsimile communication according to a header part or a main text information of the electronic mail. That is, it can be designated for each transmission, whether to carry out the retransmission by the facsimile transmission from the communication terminal device which is the transmitter of the electronic mail to the electronic mail server device 31 according to the header part or the main text information of the electronic mail to be transmitted.

Figure 5:
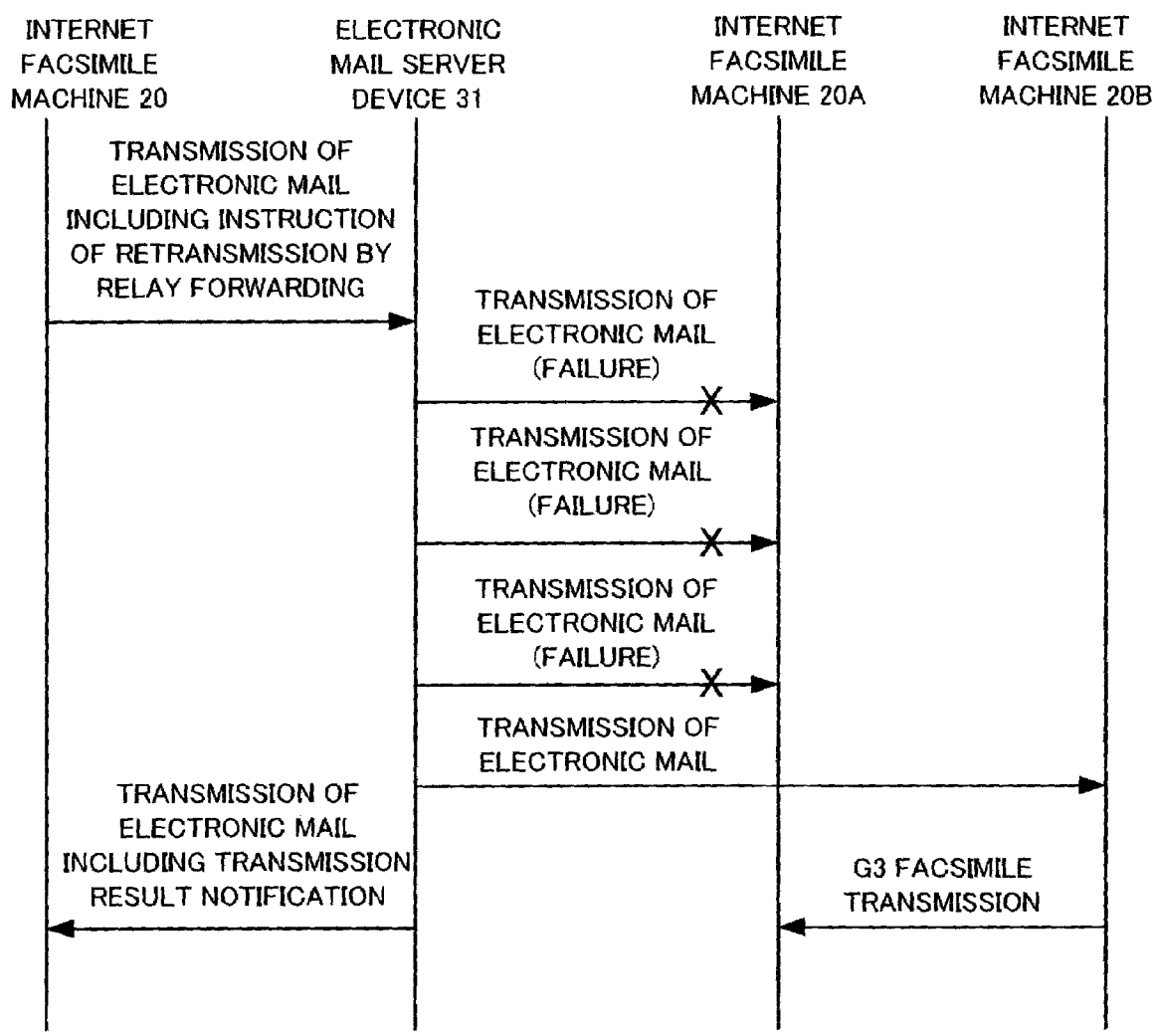
FIG. 5 is a sequence diagram showing an operation of each of the devices according to a second embodiment of the present invention.

FIG. 5 is a sequence diagram showing an operation of each of a number devices according to a second embodiment of the present invention. In FIG. 5, first, the Internet facsimile machine 20 transmits an electronic mail to the electronic mail server device 31 via the LAN 30. The electronic mail includes an instruction of retransmission by relay forwarding, and image data attached as an attached file. An example of the electronic mail is shown in the above Chart 1. Next, the electronic mail server device 31 receives the electronic mail, and temporarily stores the data of the electronic mail in the RAM 107. Then, the electronic mail server device 31 attempts to transmit the electronic mail to the Internet facsimile machine 20A of the destination via the Internet 40. In this case, when the transmission fails for three times (when the transmission protocol by the SMTP does not end normally), in accordance with the instruction for facsimile retransmission, the relay electronic mail address corresponding to the electronic mail address of the Internet facsimile machine 20A of the destination is fetched from the address/number corresponding table 107a. Then, the electronic mail including the image data that failed to be transmitted is converted into a relay instruction mail. The electronic mail is transmitted to the Internet facsimile machine 20B which is a relay terminal via the Internet 40. An example of the electronic mail is shown in Chart 2.

(Chart 2) An example of transmission electronic mail (FAX relay forward retransmission instruction mail)
From: server@sample.co.jp
Date: Wed, Mar 14, 2001 16:04:22 +0900
To: ifax5@sample.co.jp
Subject: SAMPLE MAIL
MIME-Version: 1.0
Content-Type: multipart/mixed; boundary="=_SAMPLE_="
---=_SAMPLE_=
Content-Type: text/plain; charset="us-ascii"
Content-Transfer-Encoding: 7 bit
Fax="123-456-7890"
--=_SAMPLE_=
Content-Type: image/tiff; name="faximage.tif"
Content-Transfer-Encoding: base64
Content-Disposition: attachment; filename="faximage.tif"
SUkqAAgAAAAQAP4ABAABAAAAgAAAAABBAA
 BAAAAwAYAAAEBBAABA AAAYwQAAAIBAwA-
 BAAAAAQAAAAMBAwABAAAACQAAAAY-
 BAwABAAAA AAAAAAoBAwABAAAAAgAAA-
 BEBBAABAAAA 4AAAABIBAwABAAAAAQAAA
 BUBAwABAAAAAQAAABYBBAABAAAAY-
 wQAABcB
(abbreviated)
BAABAAAA1AEAABoBBQABAAAAzgAAABsBBQA
 BAAAA1gAAACgBAwABAA AAAgAAACk-
 BAwACAAAAAAABAAAAAAD-
 MAAAAAQAAAGIAAAABAAAAAA AAAAE-
 AAAAGwAAA//8AAACA
--=_SAMPLE_=--

In the electronic mail of the Chart 2, on the tenth line, it is described as [Fax="123-456-7890"]. This description instructs the electronic mail to be forwarded to a designated facsimile machine. At the end of the electronic mail, image data with the file name ""faximage.tif"" is attached.

After receiving the electronic mail, the Internet facsimile machine 20B encodes the image data attached to the electronic mail into image data for facsimile transmission, in accordance with the above relay forward retransmission instruction. A dial and a call are made to the designated facsimile number of the Internet facsimile machine 20A of the destination via the public telephone network 50. Then, the encoded image data for the facsimile transmission is transmitted under the G3 facsimile mode. Meanwhile, when the transmission of the electronic mail is completed, the electronic mail server device 31 transmits an electronic mail to the Internet facsimile machine 20 of the transmitter via the LAN 30. The electronic mail includes a transmission result notification indicating a completion of the transmission of the electronic mail.

That is, in the second embodiment, the main control unit 101 of the electronic mail server device 31 receives the electronic mail including the attached file of the image data. Then, upon failing to transmit the electronic mail to the Internet facsimile machine 20A of the destination, the main control unit 101 transmits the relay instruction mail which instructs forwarding, to the Internet facsimile machine 20B of the relay terminal which is designated by the address/number corresponding table 107a, via the Internet 40 which is a packet exchange network. The relay instruction mail instructs to forward the image data of the electronic mail to the Internet facsimile machine 20A of the destination via the public telephone network 50 which is a circuit switching network. Moreover, the relay instruction mail includes the image data and the facsimile number of the Internet facsimile machine 20A of the destination. Therefore, since the electronic mail server device 31 executes the retransmission process via a prescribed relay terminal, workload on the Internet facsimile machine of the transmitter can be reduced, and the retransmission process can be executed promptly and reliably.

There are conventional Internet facsimile machines which carry out the retransmission by the facsimile transmission in the case of a transmission error. However, since the transmission of the electronic mail is generally carried out via the electronic mail server device, the retransmission by the facsimile cannot be carried out until a distribution error mail is received. The distribution error mail is not returned unless the electronic mail server device supports a delivery confirmation. Moreover, even when the delivery confirmation mail is returned, it is necessary to hold the image data of the original transmission until confirmation mail is returned. Therefore, in the second embodiment, the electronic mail server device 31 includes the address/number corresponding table 107a which is a storage unit for storing the electronic mail address and the facsimile number of the Internet facsimile machine of the destination, and the relay electronic mail address which is the electronic mail address of the relay terminal. These numbers correspond to one another as stored in the storage unit. The electronic mail server device 31 receives the transmission mail from the Internet facsimile machine which is the communication terminal device of the transmitter. Upon failing to distribute the transmission mail to each terminal, the electronic mail server device 31 returns the relay instruction mail to the Internet facsimile machine of the relay terminal that is designated by the address/number corresponding table 107a. Further, the relay instruction mail is formed by assigning the facsimile forwarding instruction and the destination of the forwarding to the transmission mail. The Internet facsimile machine of the transmitter can be used as the Internet facsimile machine of the relay terminal. Moreover, it can be determined whether to return the relay instruction mail (facsimile forwarding instruction mail) for each destination terminal, each broadcast address, or according to a device setting, an address of the transmitter or the like. Furthermore, it can be determined whether to instruct forwarding to the relay terminal by the relay instruction mail in accordance with the header part or the main text information of the electronic mail. That is, for each transmission, the communication terminal device, which is the transmitter of the electronic mail, can determine for the electronic mail server device 31, whether to instruct forwarding when a failure is generated in the transmission, by the relay instruction mail in accordance with the header part or the main text information of the electronic mail to be transmitted.

In the above embodiments, an example of the Internet facsimile machine 20 is described. However, the present invention is not limited to this example, and the present invention can be applied to a communication terminal device including a telephone set, a data communication device or the like that is connected to a public network such as a public telephone network or a public digital network.

In the above embodiments, a public telephone network is used for the circuit switching network. The present invention is not limited to this example, and a public digital network or a portable telephone network can be used. In addition, the Internet 40 is used for the packet exchange network. However, the present invention is not limited to this example, and an Internet Protocol (IP) exchange network of a telecommunication carrier can be used.

The invention claimed is:

1. An electronic mail server device, comprising:
an electronic mail receiving means for receiving an electronic mail with image data;
an electronic mail transmitting means for transmitting the electronic mail with image data received by the electronic mail receiving means to a destination terminal;
a facsimile transmitting means for transmitting a facsimile with image data;
a storing means for storing an electronic mail address of the destination terminal corresponding with a facsimile number of the destination terminal; and
a control means for controlling the facsimile transmitting means to transmit an image data included in the electronic mail to the destination terminal in accordance with the facsimile number corresponding to the electronic mail address of the destination terminal when the electronic mail transmitting means fails to transmit the received electronic mail with image data to the destination terminal;
wherein said control means controls a sequence of retransmissions from a plurality of terminal devices, and
wherein when the electronic mail transmitting means fails to transmit the electronic mail with image data received by the electronic mail receiving means to the destination terminal, the control means determines whether to retransmit by the facsimile transmitting means in accordance with an electronic mail address which is a transmitter of the electronic mail.

2. An electronic mail server device comprising:
an electronic mail receiving means for receiving an electronic mail;
an electronic mail transmitting means for transmitting the electronic mail received by the electronic mail receiving means to a destination terminal;
a storing means for storing an electronic mail address of the destination corresponding to a facsimile number of the destination terminal; and
a control means for controlling a remote facsimile machine to transmit an image data included in the electronic mail to a destination terminal in accordance with the facsimile number corresponding to the electronic mail address of the destination terminal when the electronic mail transmitting means fails to transmit the received electronic mail with image data to the destination terminal,
wherein when the electronic mail transmitting means fails to transmit the electronic mail with image data received by the electronic mail receiving means to the destination terminal, the control means determines whether to retransmit by facsimile the facsimile machine in accordance with an electronic mail address which is a transmitter of the electronic mail.

3. The electronic mail server device according to claim 2, wherein the remote facsimile machine is connected via a network.

4. An electronic mail server device comprising:
an electronic mail receiving means for receiving an electronic mail with image data;
an electronic mail transmitting means for transmitting the electronic mail with image data received by the electronic mail receiving means to a destination terminal;
a storing means for storing an electronic mail address of the destination terminal corresponding with a facsimile number of the destination terminal; and
a control means for transmitting to a prescribed relay terminal, a relay instruction mail which instructs the relay terminal to forward the image data included in the received electronic mail to the destination terminal in accordance with a facsimile number corresponding to an electronic mail address of the destination terminal when the electronic mail transmitting means fails to transmit the received electronic mail with image data to the destination terminal;
wherein the relay instruction mail includes image data and a facsimile number of the destination terminal, and
wherein when the electronic mail transmitting means fails to transmit the electronic mail with image data received by the electronic mail receiving means to the destination terminal, the control means determines whether to transmit the relay instruction mail to a prescribed relay terminal in accordance with the electronic mail address which is a transmitter of the electronic mail.

5. An electronic mail server device comprising:
an electronic mail receiving means for receiving an electronic mail with image data;

an electronic mail transmitting means for transmitting the electronic mail with image data received by the electronic mail receiving means to a destination terminal;

a storing means for storing an electronic mail address of the destination terminal corresponding with a facsimile number of the destination terminal; and a control means for transmitting to a prescribed relay terminal, a relay instruction mail which instructs the relay terminal to forward the image data included in the received electronic mail to the destination terminal in accordance with a facsimile number corresponding to an electronic mail address of the destination terminal when the electronic mail transmitting means fails to transmit the received electronic mail with image data to the destination terminal;

wherein the relay instruction mail includes image data and a facsimile number of the destination terminal, and wherein when the electronic mail transmitting means fails to transmit the electronic mail with image data received by the electronic mail receiving means to the destination terminal a prescribed number of times, the control means transmits to a prescribed relay terminal the relay instruction mail which instructs to forward the electronic mail with image data to the destination terminal in accordance with the facsimile number corresponding to the electronic mail address of the destination terminal.

6. An electronic mail server device comprising:

an electronic mail receiving means for receiving an electronic mail with image data;

an electronic mail transmitting means for transmitting the electronic mail with image data received by the electronic mail receiving means to a destination terminal;

a storing means for storing an electronic mail address of the destination terminal corresponding with a facsimile number of the destination terminal; and a control means for transmitting to a prescribed relay terminal, a relay instruction mail which instructs the relay terminal to forward the image data included in the received electronic mail to the destination terminal in accordance with a facsimile number corresponding to an electronic mail address of the destination terminal when the electronic mail transmitting means fails to transmit the received electronic mail with image data to the destination terminal;

wherein the relay instruction mail includes image data and a facsimile number of the destination terminal, and wherein when the electronic mail transmitting means fails to transmit the electronic mail with image data received by the electronic mail receiving means to the destination terminal, the control means determines whether to transmit the relay instruction mail to a prescribed relay terminal for each destination terminal or each broadcast address.

7. An electronic mail server device comprising:

an electronic mail receiving means for receiving an electronic mail with image data;

an electronic mail transmitting means for transmitting the electronic mail with image data received by the electronic mail receiving means to a destination terminal;

a storing means for storing an electronic mail address of the destination terminal corresponding with a facsimile number of the destination terminal; and a control means for transmitting to a prescribed relay terminal, a relay instruction mail which instructs the relay terminal to forward the image data included in the received electronic mail to the destination terminal in accordance with a facsimile number corresponding to an electronic mail address of the destination terminal when the electronic mail transmitting means fails to transmit the received electronic mail with image data to the destination terminal;

wherein the relay instruction mail includes image data and a facsimile number of the destination terminal, and wherein when the electronic mail transmitting means fails to transmit the electronic mail with image data received by the electronic mail receiving means to the destination terminal, the control means determines whether to transmit the relay instruction mail to a prescribed relay terminal in accordance with a device setting.

8. An electronic mail server device comprising:

an electronic mail receiving means for receiving an electronic mail with image data;

an electronic mail transmitting means for transmitting the electronic mail with image data received by the electronic mail receiving means to a destination terminal;

a storing means for storing an electronic mail address of the destination terminal corresponding with a facsimile number of the destination terminal; and a control means for transmitting to a prescribed relay terminal, a relay instruction mail which instructs the relay terminal to forward the image data included in the received electronic mail to the destination terminal in accordance with a facsimile number corresponding to an electronic mail address of the destination terminal when the electronic mail transmitting means fails to transmit the received electronic mail with image data to the destination terminal;

wherein the relay instruction mail includes image data and a facsimile number of the destination terminal, and wherein when the electronic mail transmitting means fails to transmit the electronic mail with image data received by the electronic mail receiving means to the destination terminal, the control means determines whether to transmit the relay instruction mail to a prescribed relay terminal in accordance with a header part or a main text information of the electronic mail.

* * * * *